United States Patent
Apte et al.

(10) Patent No.: US 6,372,165 B1
(45) Date of Patent: Apr. 16, 2002

(54) COLD ISOPRESSING METHOD

(75) Inventors: Prasad S. Apte, East Amherst; Shawn W. Callahan, Tonawanda, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/668,329

(22) Filed: Sep. 22, 2000

(51) Int. Cl.⁷ .......................... D04H 1/20; B29C 59/00; B28B 1/30
(52) U.S. Cl. ........................ 264/112; 264/122; 264/259; 264/635; 264/667
(58) Field of Search ............... 264/667–668, 264/604, 112, 122, 635, 259

(56) References Cited

U.S. PATENT DOCUMENTS

| | | | |
|---|---|---|---|
| 3,502,755 A | * 3/1970 | Murray | |
| 3,505,158 A | * 4/1970 | Murray | |
| 4,486,385 A | 12/1984 | Aslund | 419/48 |
| 4,514,158 A | 4/1985 | Pettersson | 425/78 |
| 4,541,975 A | 9/1985 | Honma et al. | 264/62 |
| 4,571,312 A | 2/1986 | Greskovich et al. | 264/1.2 |
| 4,997,604 A | 3/1991 | Hofer et al. | 264/65 |
| 5,019,330 A | 5/1991 | Bewlay et al. | 419/39 |
| 5,173,229 A | 12/1992 | Miyamoto | 264/59 |
| 5,372,178 A | * 12/1994 | Claar et al. | 164/98 |
| 5,417,917 A | 5/1995 | Takahar et al. | 419/2 |
| 5,603,876 A | 2/1997 | Honma et al. | 264/65 |
| 5,631,029 A | 5/1997 | Bewlay et al. | 425/78 |
| 5,665,291 A | 9/1997 | Honma et al. | 264/666 |
| 5,735,985 A | 4/1998 | Ghosh et al. | 156/89 |
| 5,902,429 A | 5/1999 | Apte et al. | 156/89.28 |
| RE36,249 E | 7/1999 | Zeller | 55/523 |

* cited by examiner

Primary Examiner—Christopher A. Fiorilla
(74) Attorney, Agent, or Firm—David M. Rosenblum (57) ABSTRACT

A cold isopressing method in which first and second layers of at least two layers are formed within an isopressing mold and the second of the layers is isostatically pressed against the first of the layers to compact the second layer. The layers can be formed from different materials, for instance granular materials or slurries. Each layer can additionally have different levels of materials. The granular materials can have pore formers to produce intermediate porous layers. Channel forming materials can be positioned between layers during isopressing. Alternatively, the first layers can be preformed by extrusion, slip casting or injection isopressing molding. One or more of the layers can have two or more regions of different ceramic materials.

18 Claims, 7 Drawing Sheets

COLD ISOPRESSING METHOD

FIELD OF THE INVENTION

The present invention relates to a cold isopressing method in which material is compacted within an isopressing mold. More particularly, the present invention relates to such a method in which two or more layers of material are formed within an isopressing mold and the second of the layers is isostatically pressed against the first of the two layers to compact the second layer.

BACKGROUND OF THE INVENTION

Cold isopressing is a well-known technique that is used to form filters, structural elements and ceramic membranes. In cold isopressing, a granular form of a material to be compacted is placed within an elastic isopressing mold that is sometimes called a bag. The granular material can be a ceramic or metallic powder or a mixture of powder, binder and plasticizing agents.

The isopressing mold is then positioned within a pressure vessel and slowly subjected to a hydrostatic pressure with either cold or warm water to compact the granular material into a green form which subsequently, as appropriate, can be fired and sintered.

The isopressing mold can have a cylindrical or flat configuration to produce cylindrical or plate-like articles, respectively. An example of such a process that is applied to the formation of tungsten rods is disclosed in U.S. Pat. No. 5,631,029. In this patent, fine tungsten powder is isostatically pressed into a tungsten ingot.

An important application for ceramic materials concerns the fabrication of ceramic membrane elements. Such ceramic membrane elements are fabricated from a ceramic that is selected to conduct ions of either oxygen or hydrogen at high temperatures. In an oxygen-selective membrane, the heated membrane is exposed to an oxygen-containing gas that ionizes at a cathode side of the membrane. Under a driving force of a differential oxygen partial pressure, oxygen ions are transported through the membrane to an opposite anode surface. The oxygen ions combine at the anode side of the membrane to give up electrons that are transported through the membrane or a separate electronic pathway to ionize the oxygen at the cathode side of the membrane.

A recent development in ceramic membrane technology is to form a thin dense layer of material on a porous support. The dense layer conducts ions and the supporting structure functions as a percolating porous network to add structural support to the dense layer. The porous support may also be fabricated from a material that is itself capable of transporting ions so as to be active in separating the oxygen.

Ceramic membranes such as have been described above, may be in the form of plates or tubes. It is difficult, however, to impart a complex architecture to such membranes. In the manufacture of composite tubular structures, the tube is formed by a process such as slip casting or extrusion and sintered. Thereafter, a dense layer can be sputter deposited on the outside of the extrusion. In U.S. Pat. No. 5,599,383, the dense layer is applied by chemical vapor deposition. In order to produce an even more complex architecture, several different types of processing techniques must be applied. It is desirable, however, that the number of processing steps, be minimized in that ceramic materials are, by their very nature fragile.

As will be discussed, the present invention provides a cold isopressing method in which complex structures may be directly formed without the type of complex processing stages that have been used in the prior art.

SUMMARY OF THE INVENTION

The present invention provides a cold isopressing method in which at least first and second layers are isostatically pressed within an isopressing mold so that at least the second layer is compacted and the first and second layers are laminated. The first and second layers can be formed of two different materials. For instance, the first layer could be a metal tube or other pre-form and the second layer could be a ceramic slurry coating on the tube. After the isostatic pressing, the ceramic particles within the slurry would be compacted. Alternatively, the first layer could be a granular material for instance a metallic or ceramic powder that is compacted within the isopressing mold. The resultant compacted element could then be coated with a slurry to form a second layer or the second layer could be another granular material to be compacted against the first layer. Other layers could be added or the compacted form could be further processed into a finished article. For instance in case of ceramic materials, the compacted form could be subjected to firing to burn out organic materials, such as binders and plasticizing agents, followed by sintering to produce the finished article. Alternatively, the first and second layers can be formed of the same material, for instance, if a thick ceramic article were desired, the first layer containing the material in granular form could be compacted in a cylindrical isopressing mold. Thereafter, a second layer of the same material could be placed within the isopressing mold and compacted to begin to form an additional thickness. A further possibility is to form at least one of the first or the second of the layers with at least two regions containing different materials. It is to be noted that the term "granular form" as used herein and in the claims to mean either a powder or a powder mixed with other agents such as binder or plasticizing agents.

An isopressing mold that can be used to form a tubular structure, such as required for a tubular ceramic membrane element, can be provided with a mandrel coaxially located within the cylindrical pressure bearing element to form a tubular structure. The first layer is formed about the mandrel and the second layer is formed about the first layer. The resultant tubular structure could be a tubular ceramic membrane element of the type described above. In this regard, the two layers can consist of green ceramic materials such as ceramic powders or ceramic powders mixed with other agents such as plasticizers, binders and etc. or one of the two layers could be in the form of a ceramic containing slurry. Specifically, the first layer could be formed by introducing the first of a green ceramic materials in granular form into the isopressing mold and then isostatically pressing the first of the green ceramic materials. Thereafter, the second layer could be formed by isostatically pressing the second of the green ceramic materials in granular form onto the first of the layers.

In an isopressing mold, such as has been described above, the first green ceramic material is introduced into an annular space between the mandrel and a first cylindrical pressure bearing element for isostatic pressing. After the formation of the first layer, the first cylindrical pressure bearing element can be removed and a second cylindrical pressure bearing element, having a different diameter than that of the first cylindrical pressure bearing element can be coaxially positioned over the first of the at least two layers to form another annular space. The second of the green ceramic materials is introduced into this other annular space in granular form for isopressing and formation of the second layer.

An alternative manner of forming the first layer is forming a dry slurry coating on the mandrel which has been coated with a suitable release agent, the slurry containing the first green ceramic material. The second of the two layers can then be formed by isopressing a second of the green ceramic materials in granular form against the dry slurry coating. Alternatively, the first layer can be formed by introducing a first of the green ceramic materials in granular form into the isopressing mold and isostatically pressing the first of the green ceramic materials. The second layer can then be formed by forming a dry slurry coating on the first layer, the dry slurry coating containing a second of the green ceramic materials. Thereafter, the second of the green ceramic materials is isopressed against the first of the green ceramic materials.

In order to form still more complex architectures, channel-forming elements can be positioned between the layers. Such channel-forming elements can be formed from paper or other pyrolyzable materials that will burn out during firing to produce the channels between the layers.

Another alternative is to provide one or more of the green ceramic materials in granular form with pore formers. Such pore formers might, for example, be starch, graphite, polyethylene beads, polystyrene beads or sawdust. Thus, a thin ceramic layer could be formed on the inside of a tubular membrane by, for instance, a slurry coating on the mandrel. Thereafter, the porous support layer could be formed by a green ceramic material containing the pore formers. After firing, the pore formers would burn out to leave the pores. In this regard, preferably the pore formers are present within the green ceramic materials in amounts sufficient to produce a porosity of between about 1% and about 90% after firing.

The first layer can be formed by extrusion, slip casting, dry pressing or injection isopressing molding. Thereafter, the second layer in granular form or in the form of a slurry can be introduced into the isopressing mold and isostatically pressed against the first layer.

As may be apparent, additional layers containing the same or different materials can be added to form a variety of porous or dense layers. Furthermore, at least one of the first and the second layers can be formed from at least two levels of different green ceramic materials.

At least one of the green ceramic materials can be a mixed conducting oxide given by the formula: $A_xA'_{x'}A''_{x''}B_yB'_{y'}B''_{y''}O_{3-z}$, where A, A', A'' are chosen from the groups 1, 2, 3 and the f-block lanthanides; and B, B', B'' are chosen from the d-block transition metals according to the Periodic Table of the Elements adopted by the IUPAC. In the formula, $0<x\leq1$, $0\leq x'\leq1$, $0\leq x''\leq1$, $0\leq y\leq1$, $0\leq y'\leq1$, $0\leq y''\leq1$ and z is a number which renders the compound charge neutral. Preferably, each of A, A', and A'' is magnesium, calcium, strontium or barium.

As an alternative, at least one of the green ceramic materials can be a mixed conducting oxide given by the formula: $A'_sA''_tB_uB'_vB''_wO_x$ where A represents a lanthanide, Y, or mixture thereof, A' represents an alkaline earth metal or mixture thereof; B represents Fe; B' represents Cr, Ti, or mixture thereof and B'' represents Mn, Co, V, Ni, Cu or mixture thereof. Each of s, t, u, v, and w represent a number from 0 to about 1. Further, s/t is between about 0.01 and about 100, u is between about 0.01 and about 1, and x is a number that satisfies the valences of A, A', B, B', and B'' in the formula. Additionally, $0.9<(s+t)/u+v+w)<1.1$.

BRIEF DESCRIPTION OF THE DRAWINGS

While the specification concludes with claims distinctly pointing out the subject matter than Applicants regard as their invention, it is believed the invention will be better understood when taken in connection with the accompanying drawings in which:

DETAILED DESCRIPTION

The present invention can be applied to form a composite element of any shape that is amenable to being formed by cold isopressing. For instance, with reference to FIG. 1 an isopressing mold 1 is illustrated that is designed to form a block-like element. Isopressing mold 1 is provided with lateral pressure bearing elements 10 and 11 and top and bottom pressure bearing elements 12 and 14 preferably fabricated from polyurethane. Although not shown in the illustration, isopressing mold 1 is provided with additional lateral pressure bearing elements at right angles to lateral pressure bearing elements 10 and 11 to complete mold 1. First layer 16 could be a ceramic material in granular form or a metallic powder or other material (as will be discussed) to be compacted.

Figure 1:
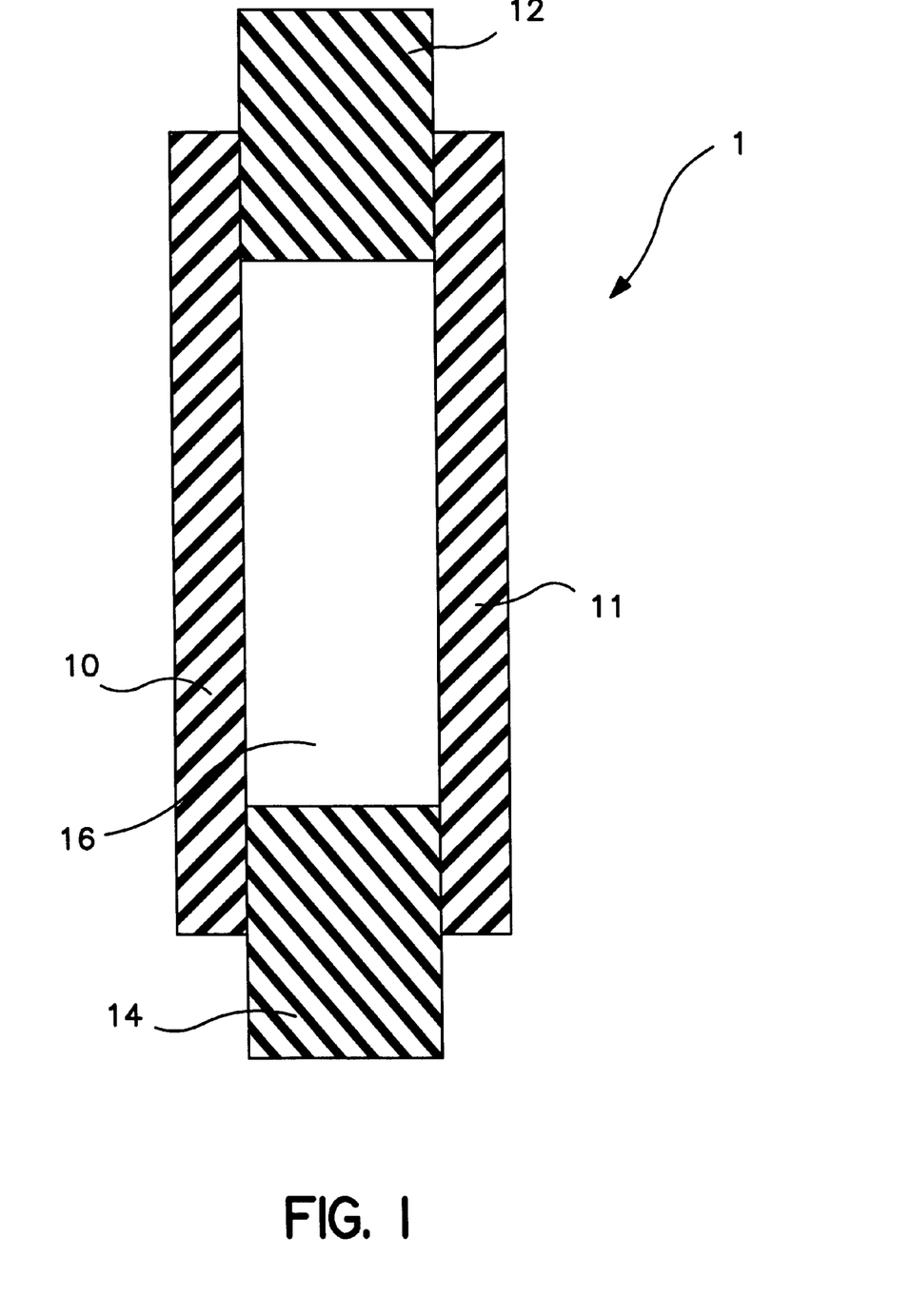
FIG. 1 is a sectional, schematic elevational view of an isopressing mold filled with loose powder.

Isopressing mold 1 is then placed within a pressure vessel and then slowly subjected to hydrostatic pressure with cold or warm water. Upon application of hydrostatic pressure, lateral and top and bottom pressure bearing elements 10, 11, 12 and 14 inwardly flex to effect the compaction of first layer of material 16 into a block-like mass.

Figure 2:
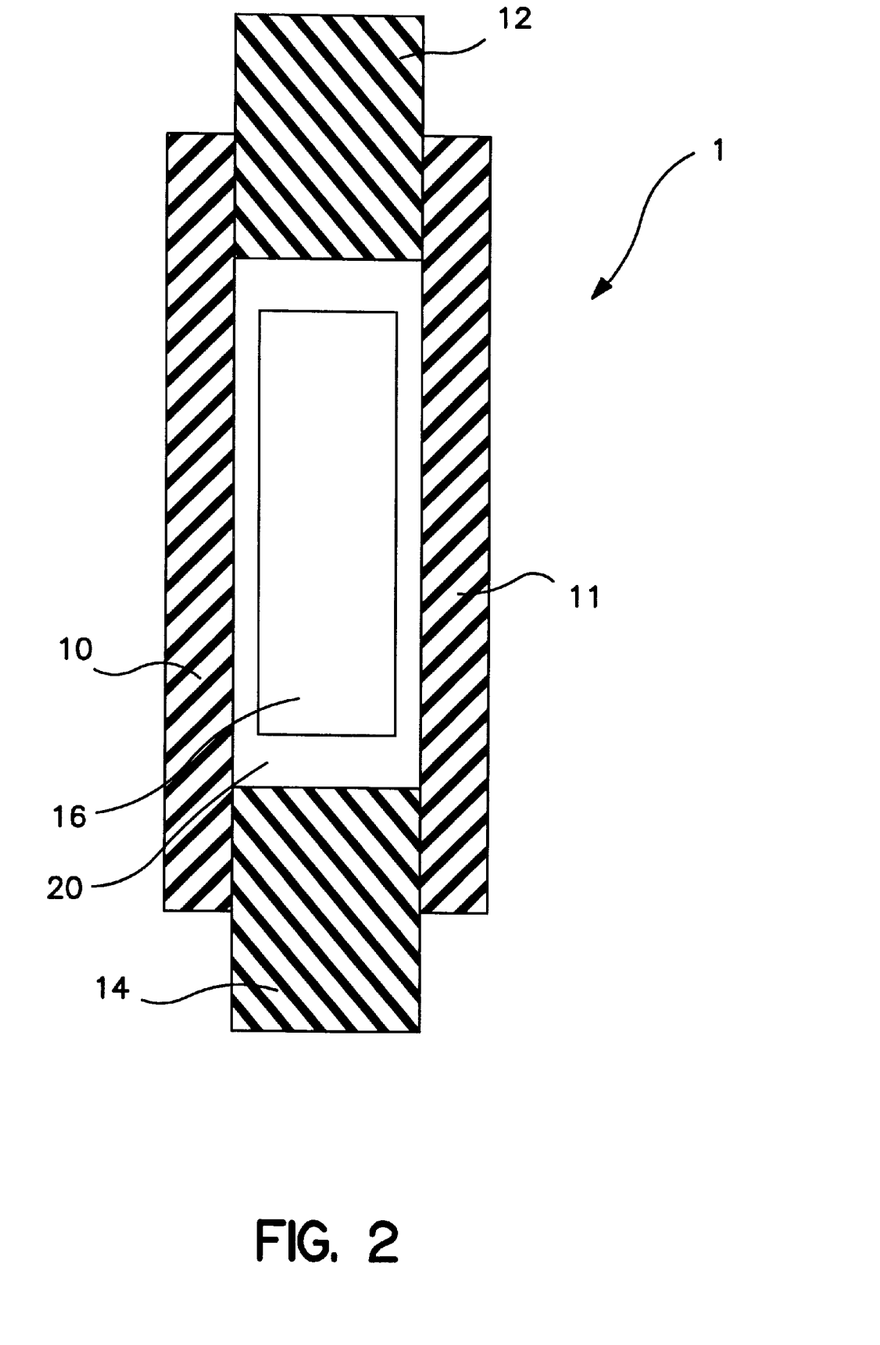
FIG. 2 is a subsequent processing step involving the isopressing mold illustrated in FIG. 1 in which the loose powder has been compacting by cold isopressing to reveal a gap between the isopressing mold and the powder.
Figure 3:
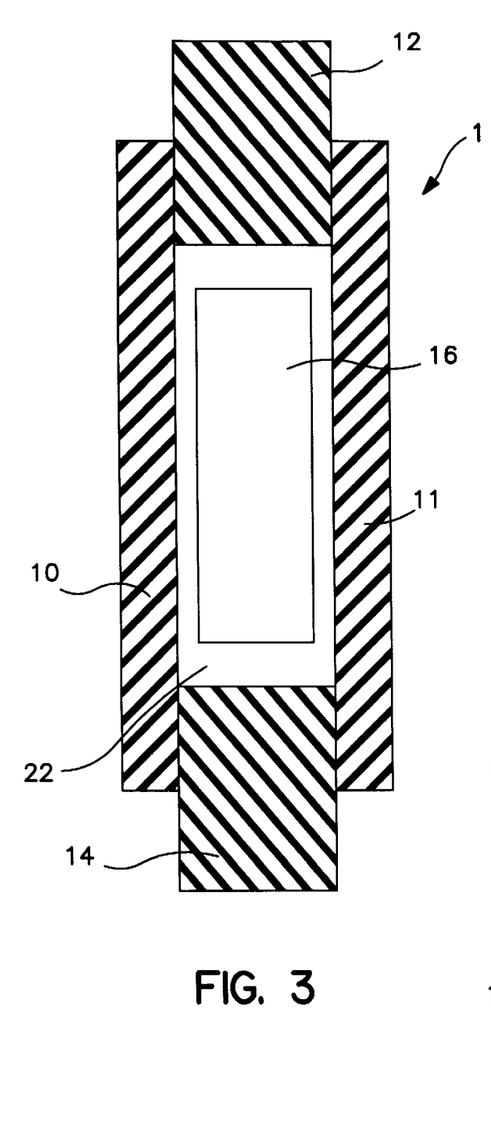
FIG. 3 is a processing step subsequent to that illustrated in FIG. 2 in which the isopressing mold is then filled with a second layer of loose powder within the gap formed in the step shown FIG. 2.
Figure 4:
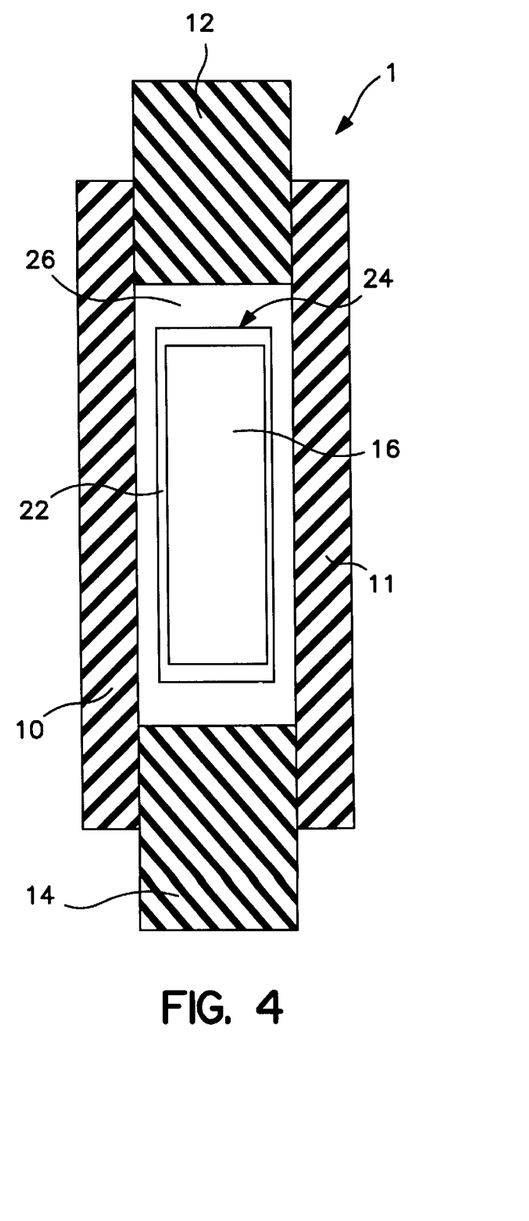
FIG. 4 illustrates isopressing mold 1 after the second layer has been cold isopressed about the first layer.

With reference to FIG. 2, after compaction of first layer of material 16 into the block-like mass, a gap 20 is produced. With added reference to FIG. 3, isopressing mold 1 is then filled with a second layer of material 22 which can either be in granular form or a slurry located within gap 20. Isopressing mold 1 is again placed within a pressure vessel and subjected to hydrostatic pressure with cold or warm water. After the second layer of material 22 has been compacted against the first layer of material 16, a composite block-like mass 24 is produced having an outer second layer 22 to reveal a gap 26 surrounding the two-layered mass of compacted material-See FIG. 4. The composite block-like mass can then be removed for further processing such as firing or sintering or prior to such further processing, additional layers of material can be introduced into gap 26 for further compaction. Alternatively, it is possible to simply place the isopressing mold 1 within a furnace and allow it to burn off.

Figures 5, 6:
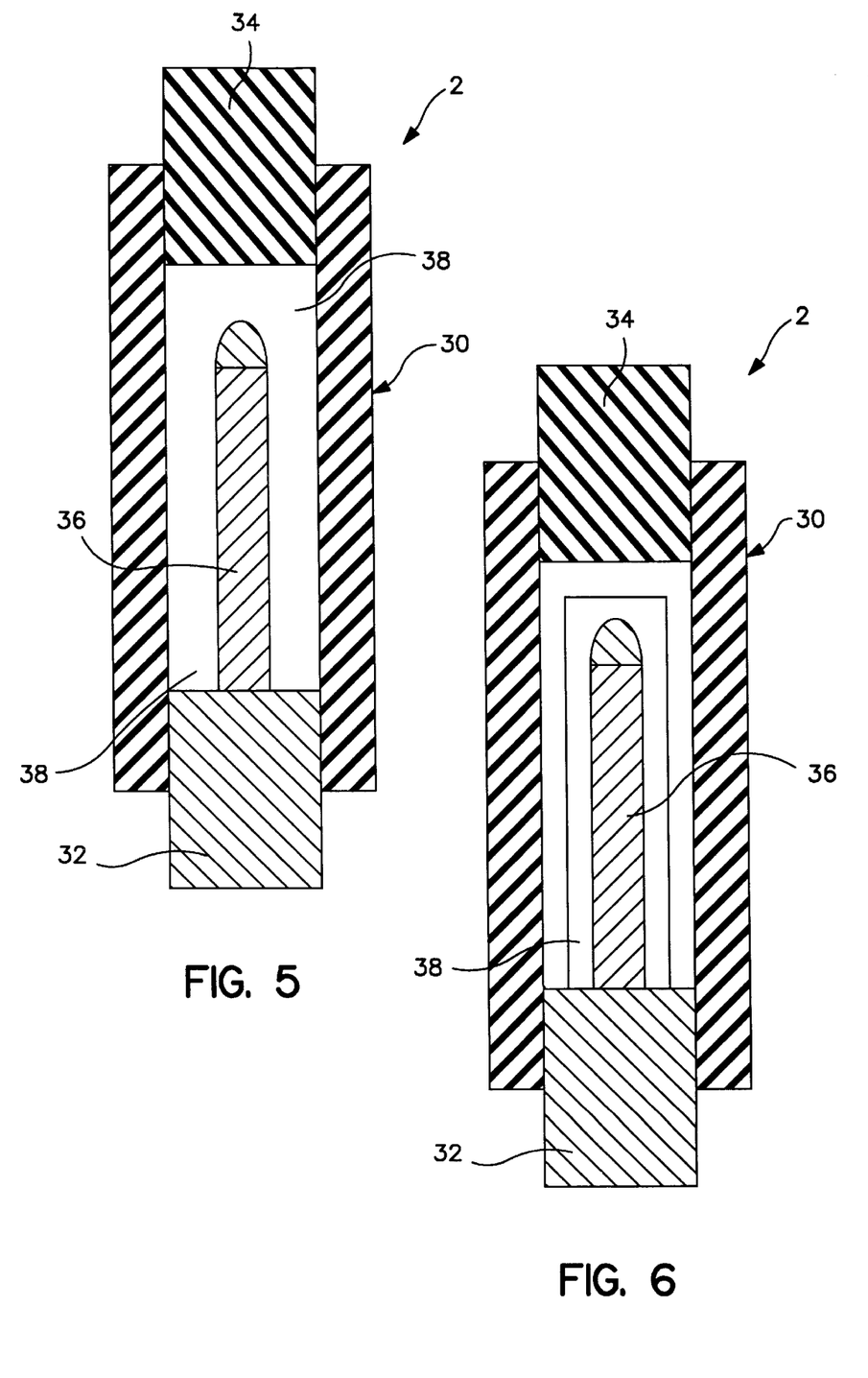
FIG. 5 is a sectional, schematic elevational view of an isopressing mold having a central mandrel in which loose powder is added to the isopressing mold.
FIG. 6 is a view of the isopressing mold of FIG. 5 after the powder has been subjected to cold isopressing to reveal a gap or an annular space between the isopressing mold and the packed powder.

With reference to FIG. 5 an isopressing mold 2 is illustrated having a cylindrical pressure bearing element 30, base and end plugs 32 and 34 and a mandrel 36 attached to base plug 32 so as to produce a hollow tube. Isopressing mold 2 can be filled with a first layer of material 38. First layer of material 38 could be a green ceramic material in granular form or a slurry coating on the mandrel 36. The green ceramic material in granular form might contain pore forming material such as starch, graphite, polyethylene beads, polystyrene beads, sawdust, and other known pore forming materials. First and second layers 16 and 18 discussed above with respect to isopressing mold 1 might also be provided with such pore forming material.

Figure 7:
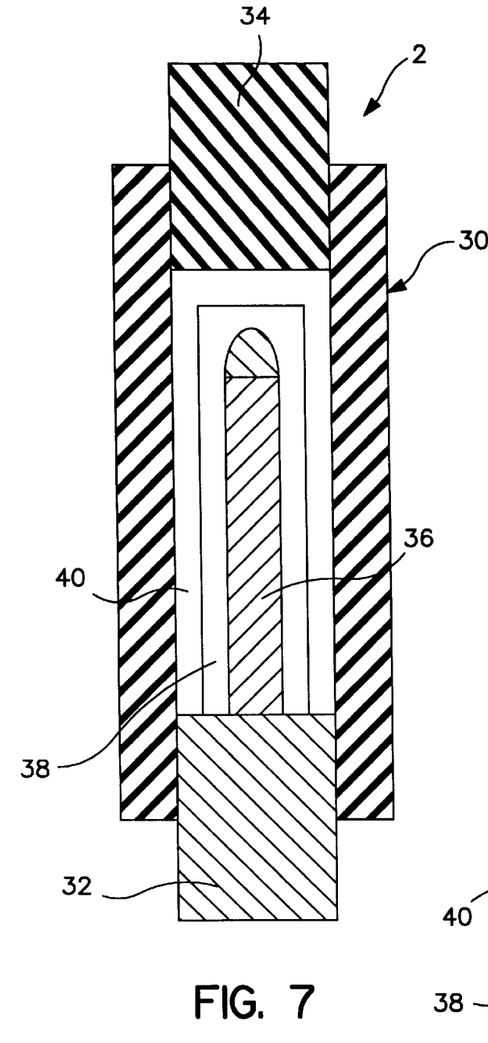
FIG. 7 illustrates the isopressing mold shown in FIG. 6 after a second layer of loose powder has been added to the annular space produced within the isopressing mold in the state shown in FIG. 6.

With added reference to FIG. 6, after isostatic compaction, end plug 34 can be removed and as shown in FIG. 7, isopressing mold 2 can be filled with a second layer of material 40, again possibly of a green ceramic material in granular form with or without the pore forming materials outlined above.

Alternatively, cylindrical pressure bearing element 30 can be separated from base plug 32 and the compacted first layer of material 38 could be dip-coated with a slurry to form second layer of material 40. Once dry, isopressing mold 2 could be reassembled to subject second layer of material 40 to isostatic compaction. It is to be noted that the thickness of any layer formed by a slurry (either as an inner or outer layer) can be controlled by multiple applications of slurry solutions. Additionally, the slurry solutions can themselves contain pore formers. As such, multiple layers formed from slurries can be produced having graded porosities.

Still further options would be to pre-form first layer of material 38 by extrusion, slip casting, dry pressing or injection. A like option could be exercised for first layer of material 16 outlined above for isopressing mold 1. In such case the first layer would simply be placed within isopressing mold 2. Prior to any isostatic pressing, a second layer of material such as second layer 40 could be added. The isopressing mold 2 would then be sealed and the second layer 40 compacted against the first layer.

Figure 8:
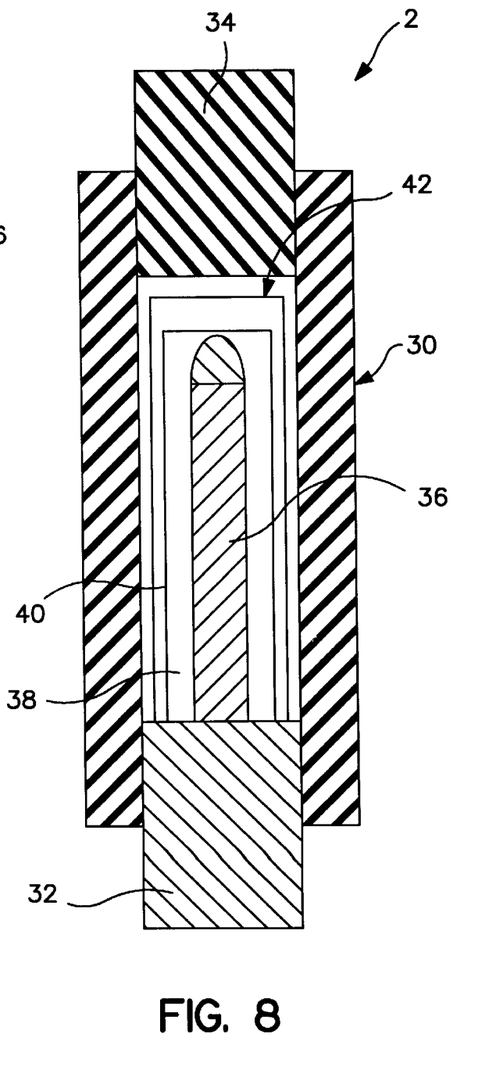
FIG. 8 is a schematic illustration of the isopressing mold shown in FIG. 7 after cold isopressing.

As illustrated in FIG. 8, second layer of material 40 has been compacted by isostatic pressure to form a composite tube 42. Thereafter, isopressing mold 2 can be broken down and the composite tube 42 be removed for subsequent processing such as by firing or sintering or the application of additional layers.

Figure 9:
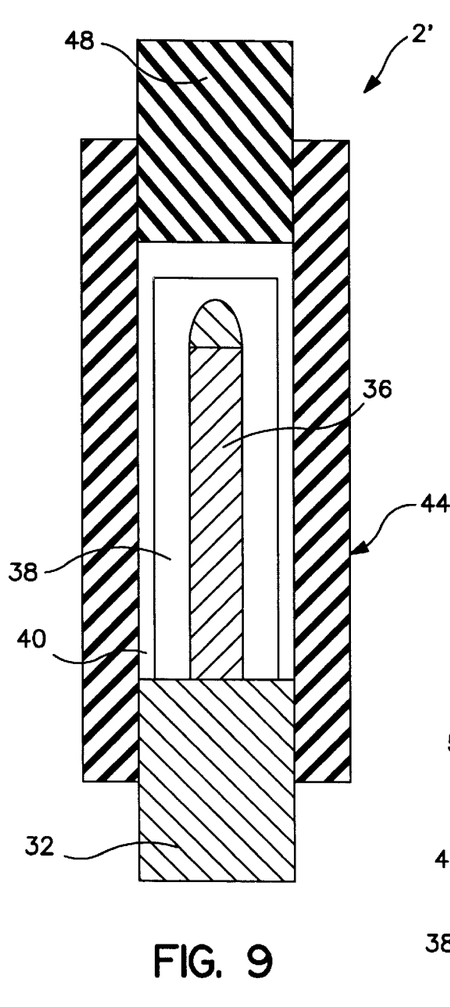
FIG. 9 is a schematic illustration of an embodiment of the present invention in which the cylindrical pressure bearing element of the isopressing mold of FIG. 6 has been replaced with a cylindrical pressure bearing element having a different diameter to produce a composite structure having layers of different thicknesses.

With reference to FIG. 9, as an alternative to the processing shown in FIGS. 7 and 8, base plug 32 can be removed from cylindrical pressure bearing element 30 and a cylindrical pressure bearing element 44 of reduced diameter can be substituted. A second layer of material 46 can then be added. The resultant isopressing mold 2' is then sealed with an end plug 48. After isostatic pressing, the compacted second layer of material 46 would have less of a thickness than the compacted second layer of material 40 shown in FIG. 8. As may be appreciated the process could be reversed by using first cylindrical pressure bearing element 44 and then a cylindrical pressure bearing element 30 so that the second layer were thicker than the first layer.

In the event that the formed article is to function as a ceramic membrane element, the ceramic materials utilized for the layers (for instance, first and second layers 16 and 22 or first and second layers 38 and 40) can be a mixed conducting ceramic capable of conducting oxygen ions and electrons. Such materials could be in the form of powders or powders mixed with other organic agents. In case of a slurry, a typical composition might include about 120 gm of ceramic material, 100 gm of a solvent such as toluene and 20 gm of organic binder, plasticizer, coplasticizer material required to make a stable suspension. Examples of such materials are set forth in the following table.

EXAMPLES OF MIXED CONDUCTING SOLID ELECTROLYTES

| Material composition |
|---|
| 1. $(La_{1-x}Sr_x)(Co_{1-y}Fe_y)O_{3-\delta}$ ($0 \leq x \leq 1$, $0 \leq y \leq 1$, $\delta$ from stoichiometry) |
| 2. $SrMnO_{3-\delta}$ $SrMn_{1-x}Co_xO_{3-\delta}$ ($0 \leq x \leq 1$, $\delta$ from stoichiometry) $Sr_{1-x}Na_xMnO_{3-\delta}$ |
| 3. $BaFe_{0.5}Co_{0.5}YO_3$ $SrCeO_3$ $YBa_2Cu_3O_{7-\delta}$ ($0 \leq \delta \leq 1$, $\delta$ from stoichiometry) |
| 4. $La_{0.2}Ba_{0.8}Co_{0.8}Fe_{0.2}O_{2.6}$; $Pr_{0.2}Ba_{0.8}Co_{0.8}Fe_{0.2}O_{2.6}$ |
| 5. $A_xA'_{x'}A''_{x''}B_yB'_{y'}B''_{y''}O_{3-z}$ (x, x', x'', y, y', y'' and z all in 0–1 range) where: A, A', A'' = from groups 1, 2, 3 and f-block lanthanides B, B', B'' = from d-block transition metals |
| 6. (a) Co—La—Bi type:    Cobalt oxide    15–75 mole %      Lanthanum oxide    13–45 mole %      Bismuth oxide    17–50 mole % |
|    (b) Co—Sr—Ce type:    Cobalt oxide    15–40 mole %      Strontium oxide    40–55 mole %      Cerium oxide    15–40 mole % |
|    (c) Co—Sr—Bi type:    Cobalt oxide    10–40 mole %      Strontium oxide    5–50 mole %      Bismuth oxide    35–70 mole % |
|    (d) Co—La—Ce type:    Cobalt oxide    10–40 mole %      Lanthanum oxide    10–40 mole %      Cerium oxide    30–70 mole % |
|    (e) Co—La—Sr—Bi type:    Cobalt oxide    15–70 mole %      Lanthanum oxide    1–40 mole %      Strontium oxide    1–40 mole %      Bismuth oxide    25–50 mole % |
|    (f) Co—La—Sr—Ce type:    Cobalt oxide    10–40 mole %      Lanthanum oxide    1–35 mole %      Strontium oxide    1–35 mole %      Cerium oxide    30–70 mole % |
| 7. $Bi_{2-x-y}M'_xM_yO_{3-\delta}$ ($0 \leq x \leq 1, 0 \leq y \leq 1$, $\delta$ from stoichiometry) where: M' = Er, Y, Tm, Yb, Tb, Lu, Nd, Sm, Dy, Sr, Hf, Th, Ta, Nb, Pb, Sn, In, Ca, Sr, La and mixtures thereof M = Mn Fe, Co, Ni, Cu and mixtures thereof |
| 8. $BaCe_{1-x}Gd_xO_{3-x/2}$ where, x equals from zero to about 1. |
| 9. One of the materials of $A_xA'_tB_uB'_vB''_wO_x$ family whose composition is disclosed in U.S. Pat. No. 5,306,411 (Mazanec et al.) as follows: A represents a lanthanide or Y, or a mixture thereof; A' represents an alkaline earth metal or a mixture thereof; |

-continued

Material composition

B represents Fe;
B' represents Cr or Ti, or a mixture thereof;
B" represents Mn, Co, V, Ni or Cu, or a mixture thereof;
and s, t, u, v, w, and x are numbers such that:
s/t equals from about 0.01 to about 100;
u equals from about 0.01 to about 1;
v equals from zero to about 1;
w equals from zero to about 1;
x equals a number that satisfies the valences of the A, A', B, B', B" in the formula; and $0.9 < (s + t)/(u + v + w) < 1.1$ 10. One of the materials of $Ce_{1-x}A_xO_{2-\delta}$ family, where:
A represents a lanthanide, Ru, or Y; or a mixture thereof;
x equals from zero to about 1;
y equals from zero to about 1;
δ equals a number that satisfies the valences of Ce and A in the formula.

11. One of the materials of $Sr_{1-x}Bi_xFeO_{3-\delta}$ family, where:
A represents a lanthanide or Y, or a mixture thereof;
x equals from zero to about 1;
y equals from zero to about 1;
δ equals a number that satisfies the valences of Ce and A in the formula.

12. One of the materials of $Sr_xFe_yCo_zO_w$ family, where:
x equals from zero to about 1;
y equals from zero to about 1;
z equals from zero to about 1;
w equals a number that satisfies the valences of Sr, Fe and Co in the formula.

13. Dual phase mixed conductors (electronic/ionic):
$(Pd)_{0.5}/(YSZ)_{0.5}$
$(Pt)_{0.5}/(YSZ)_{0.5}$
$(B—MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.5\%}Zr_{2.5\%})_{0.5}/(YSZ)_{0.5}$
Any of the materials described in 1–13, to which a high temperature metallic phase (e.g., Pd, Pt, Ag, Au, Ti, Ta, W) is added.

Figure 10:
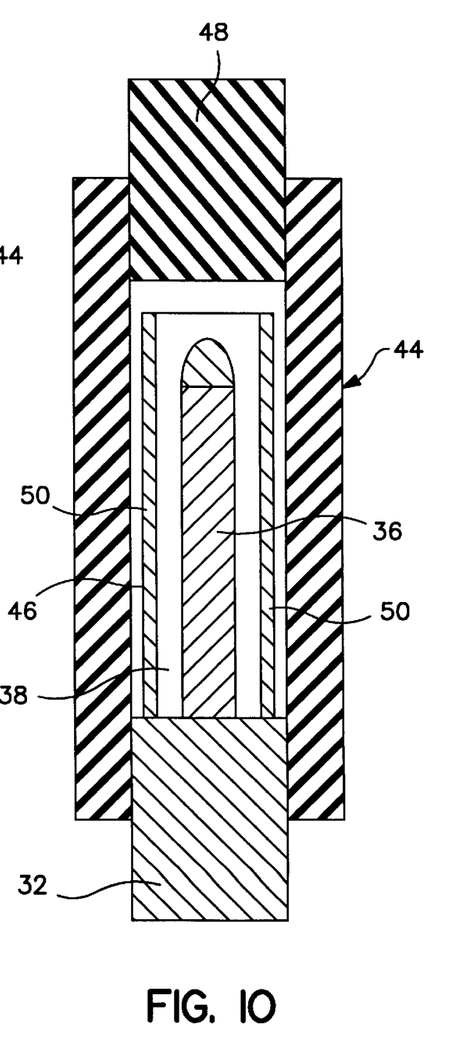
FIG. 10 is a schematic illustration of an alternative embodiment for processing the isopressing mold in the state shown in FIG. 7 by adding a channel forming material between layers.
Figure 11:
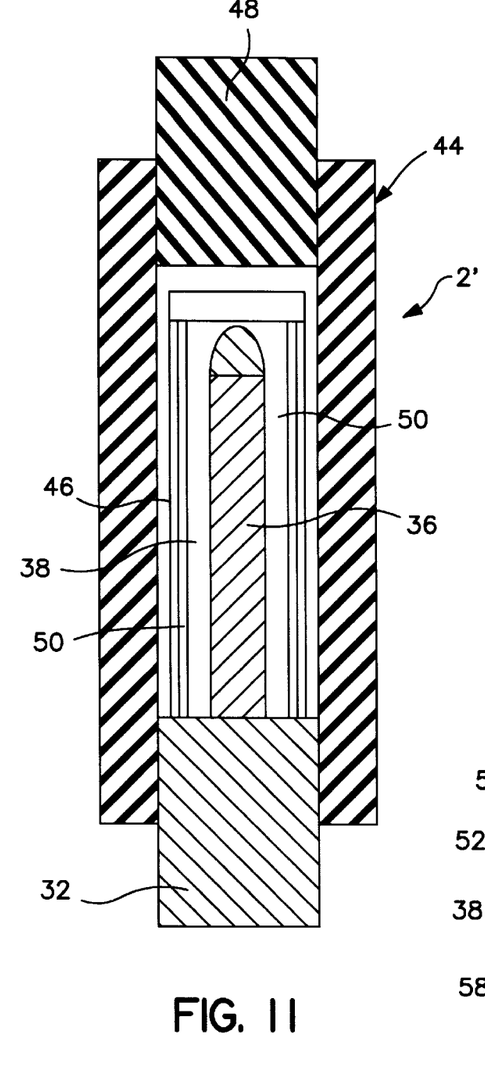
FIG. 11 illustrates the isopressing mold in the state shown in FIG. 10 after having been subjected to isostatic pressure.

14. One of the materials of $A_{2-x}A'_xB_{2-y}B'_yO_{5+z}$ family whose composition is disclosed in WO 97/41060 (Schwartz et al.) as follows:
A represents an alkaline earth metal or a mixture thereof;
A' represents a lanthanide or Y, or a mixture thereof;
B represents a metal ion or mixtures of 3d transition metal ions and group 13 metals;
B' represents a metal ion or mixtures of 3d transition metal ions and group 13 metals, the lanthanides and yttrium;
$0 < x < 2$; $0 < y < 2$; z renders the compound charge neutral 15. One of the materials of $Ln_xA'_{x'}Co_yFe_{y'}Cu_{y''}O_{3-z}$ family whose composition is disclosed in EP 0 732 305 A1 (Dyer et al.) as follows:
Ln represents a fblock lanthanide;
A' represents Sr or Ca;
$x > 0$, $y > 0$, $x + x' = 1$, $y + y' + y'' = 1$, $0 < y \leq 0.4$
z renders the compound charge neutral 16. One of the materials of $Ln_xA'_{x'}A''_{x''}B_yB'_{y'}B''_{y''}O_{3-z}O_{3-z}$ family whose composition is disclosed in EP 0 931 763 A1 (Dyer et al.) as follows:
Ln represents a fblock lanthanide;
A' from groups 2;
A" from groups 1, 2, 3 and f-block lanthanides
B, B' from d-block transition metals excluding Ti and Cr
$0 \leq x < 1$, $0 < x' \leq 1$, $0 < y < 1.1$, $0 \leq y' < 1.1$, $x + x' + x'' = 1.0$, $1.1 > y + y' > 1.0$, z renders the compound charge neutral With additional reference to FIG. 10, between the time the second layer of material is added, such as second layer of material 46 in FIG. 9, a channel forming material 50, in the form of strips, can be positioned between first and second layers 38 and 46. As illustrated in FIG. 11, after isostatic pressing, channel forming material 50 is located between first and second layers of materials 38 and 46 for eventual removal by burn out and other conventional techniques.

Figure 12:
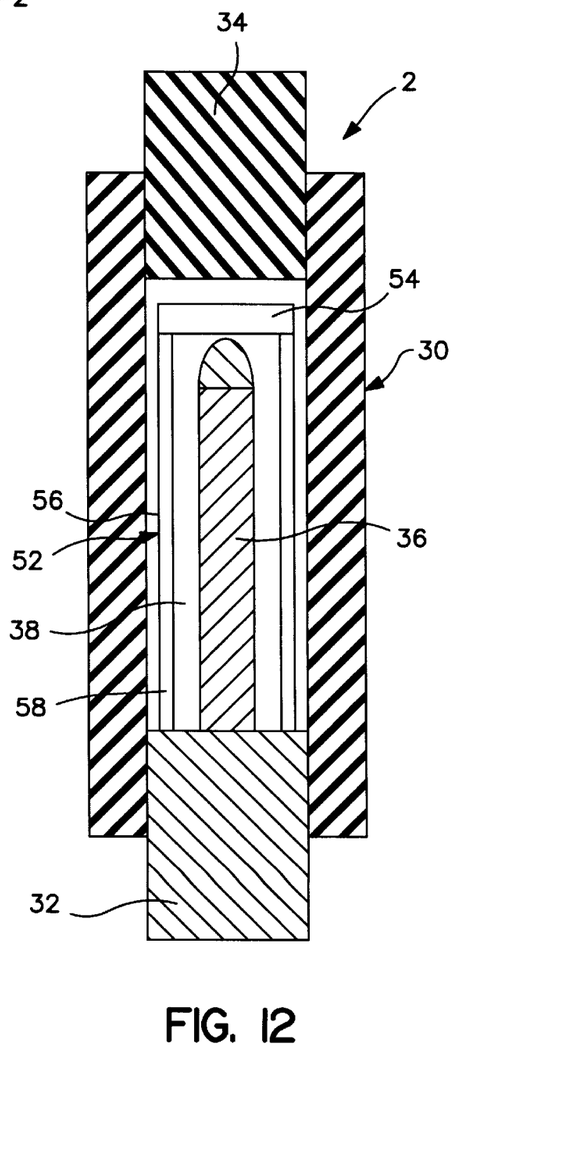
FIG. 12 is a schematic, sectional illustration of an isopressing mold of the type show in FIG. 5 after compaction and the addition of a second layer having three different levels of material added.

With reference to FIG. 12, after a first layer 38 is provided, such as illustrated in FIG. 5, and compacted, a second layer 52 can be added and compacted as shown in FIG. 6. Second layer 52 can have three regions of material 54, 56, and 58 to vary the type of material along the length of the molded article. In practice, after the compaction of the first layer as shown in FIG. 6, powder forming region 58 is added to the mold to the desired level. Thereafter, the powder forming region 56 is added to its desired level and the mold is topped off with the powder forming region 54. Any and all of the layers of material can be formed in such manner. As may be appreciated, embodiments are possible in which a layer is formed with two regions or four or more regions.

Cylindrical pressure bearing element 30 (or cylindrical pressure bearing element 44 for that matter) is preferably made of a material, that for the given dimensions of such elements, will result in a sufficient rigidity thereof that ceramic materials can be introduced into isopressing molds 1 and 2 while cylindrical pressure bearing element 30 retains its shape. In this regard, the concern here is to prevent wrinkling of cylindrical pressure bearing element 30 that could produce a hang up of ceramic material within an annular filling space formed between the cylindrical pressure bearing elements and their associated mandrels. Furthermore, such rigidity insures that the transverse cross-section of such an annular filling space will remain constant along the length of the isopressing mold so that the finished ceramic tube will be of constant thickness. A further material consideration for a cylindrical pressure bearing element used herein is that the material must be sufficiently resilient to retract or equally pull away from the isopressing molded article to allow the finished green ceramic form to be removed from the isopressing mold after the relaxation of hydrostatic pressure.

Preferably, cylindrical pressure bearing elements are fabricated from materials such as polyurethane with a hardness of 95A on the durometer scale. Hardnesses of between 75A and 75D on the durometer scale are also useful. Harder materials are preferred over softer materials because it has been found that ceramic materials tend not to adhere to harder materials.

The following is an example of a composite ceramic tube fabricated in accordance with the present invention. The object of the experiment was to make a closed end tube with one porous and one dense layer. Further the layered structure was to be restricted to the middle portion of the tube while the open and the closed ends were to have a dense structure.

The cylindrical pressure bearing element of the mold for making the tube was made from a 95A durometer polyurethane and had an inside diameter of about 0.5". A steel mandrel with an outside diameter of about 0.45" was placed in the cylindrical pressure bearing element of the mold. The annular gap between the mandrel and the cylindrical pressure bearing element was filled with spray granulated powder of a nominal composition La[0.2]Sr[0.8]Fe[0.8]Cr[0.2] O[3] while the mold was vibrated. Once the desired powder level was reached, the mold was taken off the vibrator and capped with a polyurethane cap. The mold was then placed in an isostatic press and subjected to a compaction pressure of 40,000 psi. The mold was removed from the press and the cap was removed. This revealed an annular gap around the mandrel allowing the cylindrical pressure bearing element could be removed easily therefrom. A new cylindrical pressure bearing element within an inner diameter of about 0.625" was then positioned on the mandrel. This cylindrical pressure bearing element additionally had a conical modification on one end to produce a cone shaped open end on the final tube.

About 5 gm of the powder mentioned above was poured into the annular gap while the mold was held on a vibrator. This was followed by about 10 gm of a powder mixture containing the above mentioned powder and about 40% by volume [20 wt %] of a pyrolyzable pore former like graphite. The top end of the mold was again filled with the original powder without the pore former. The mold was closed with a polyurethane cap and isostatically compacted to a pressure of 40,000 psi for about 5 minutes. It is possible and may be desirable to press the different layers at different compaction pressures depending on the required structures and properties. The mold was removed from the isostatic press and the mold was disassembled.

The green tube thus produced was placed in a furnace, the binder and pore formers were removed by heating in air for a sufficient time and temperature and the tube was then sintered in flowing nitrogen at a maximum temperature of 1275 celsius degrees. After sintering the tube had dense open and closed ends. In the shank of the tube there was a dense inside layer of about 0.008" [200 micron] and a porous outside layer of about 0.032" [800 micron].

The sintered tube was evaluated for oxygen flux at about 1000° C. with air on the dense side and a mixture of 70% hydrogen and 30% $CO_2$ on the porous side. A flux of about 25 sccm/sq. cm was obtained.

While the present invention has been described with reference to preferred embodiments, as will occur to those skilled in the art, numerous changes, additions and omissions may be made without departing from the spirit and scope of the present invention.

What is claimed is:

1. A cold isopressing method comprising:
   covering a mandrel of an isopressing mold with a first material;
   assembling an isopressing mold by coaxially locating said mandrel within a cylindrical pressure bearing element and sealing said cylindrical pressure bearing element at opposite ends, one of said opposite ends of said cylindrical pressure bearing element being sealed with an end pressure bearing element spaced apart from said mandrel;
   isostatically pressing said first material within said isopressing mold to produce a first layer in a form of a tube closed at one end and open at the other end thereof;
   disassembling said isopressing mold to allow said first layer to be covered with a second material;
   covering said first layer with said second material;
   reassembling said isopressing mold; and
   isostatically pressing said second material to form a compacted second layer and to laminate the first and second layers.

2. The method of claim 1, wherein the first and second materials comprise two different materials.

3. The method of claim 1, wherein:
   the second material forming the second layer is in granular form;
   the isopressing mold is disassembled by removing said end pressure bearing element;
   said first layer is covered by said second material by filling said cylindrical pressure bearing element with the second material until the first layer is covered thereby; and
   said isopressing mold is reassembled by re-sealing said one of said opposite ends of said cylindrical pressure bearing element with said end pressure bearing elements.

4. The method of claim 1, wherein the second material forming the second layer is a slurry.

5. The method of claim 1, wherein at least one of the first and second layers has at least two regions containing different materials.

6. The method of claim 1, wherein said at least two layers consists of green ceramic materials.

7. The method of claim 6, wherein said first and second materials are in granular form.

8. The method of claim 7, wherein:
   the isopressing mold has a first cylindrical pressure bearing element through which said mandrel projects to form an annular space into which said first material is added for isostatic pressing; and
   after the formation of the first layer, the first cylindrical pressure bearing element is removed and a second cylindrical pressure bearing element, having a different diameter than that of said first cylindrical pressure bearing element, is coaxially positioned over the first of the at least two layers to form another annular space into which said second of said second material is introduced for isopressing and formation of the second layer.

9. The method of claim 6, wherein:
   the mandrel is covered by said first material by forming a dry slurry coating on said mandrel, the dry coating of slurry containing the first material; and
   the second material is in a granular form prior to being isostatically pressured.

10. The method of claim 6, wherein:
    the first layer is formed by introducing the first material in a granular form into the isopressing mold and isostatically pressing said first material; and
    said second layer is formed by forming a dry slurry coating on said first layer, the dry slurry coating containing the second material.

11. The method of claim 6, further comprising positioning channel forming elements on the first layer prior to formation of the second layer.

12. The method of claim 6, wherein at least one of the first and second materials prior to being isostatically pressed is in granular form and contains pore formers.

13. The method of claim 12, wherein said pore formers are starch, graphite, polyethylene beads, polystyrene beads or sawdust.

14. The method of claim 13, wherein said pore formers are present within said at least one of the first and second materials in an amount sufficient to produce a porosity in at least one of said at least two layers of between about 1% and about 90% after firing.

15. The method of claim 6, wherein at least one of the first and the second layers is formed from at least two levels of different green ceramic materials.

16. The method of claim 6, wherein at least one of the green ceramic materials is a mixed conducting oxide given by the formula: $A_xA'_{x'}A''_{x''}B_yB'_{y'}B''_{y''}O_{3-z}$, where A, A', A" are chosen from the groups 1, 2, 3 and the f-block lanthanides; and B, B', B" are chosen from the d-block transition metals according to the Periodic Table of the Elements adopted by the IUPAC wherein $0<x\leq1$, $0\leq x'\leq1$, $0\leq x''\leq1$, $0\leq y\leq1$, $0\leq y'\leq1$, $0\leq y''\leq1$, and z is a number which renders the compound charge neutral.

17. The method of claim 16, wherein, each of A, A', and A" is magnesium, calcium, strontium or barium.

18. The method of claim 16, wherein at least one of the green ceramic materials is a mixed conducting oxide given by the formula: $A'_sA''_tB_uB'_vB''_wO_x$ where A represents a lanthanide, Y, or mixture thereof, A' represents an alkaline earth metal or mixture thereof; B represents Fe; B' represents Cr, Ti, or mixture thereof and B" represents Mn, Co, V, Ni, Cu or mixture thereof, S, t, u, v, and w each represents a number from 0 to about 1, s/t is between about 0.01 and about 100, u is between about 0.01 and about 1, x is a number that satisfies the valences of A, A', B, B', and B" in the formula, and $0.9<(s+t)/(u+v+w)<1.1$.

* * * * *